(12) United States Patent
Alpern et al.

(10) Patent No.: US 6,510,440 B1
(45) Date of Patent: *Jan. 21, 2003

(54) METHOD AND APPARATUS FOR PERFORMING GENERATIONAL GARBAGE COLLECTION USING BARRIER BITS

(75) Inventors: Bowen Alpern, Peekskill, NY (US); Clement Richard Attanasio, Cortlandt Manor, NY (US); Stephen Edwin Smith, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,189

(22) Filed: Jan. 10, 2000

(51) Int. Cl.[7] ........................... G06F 12/00; G06F 17/30
(52) U.S. Cl. ........................................ 707/206; 707/200
(58) Field of Search ............................... 707/200, 206

(56) References Cited

U.S. PATENT DOCUMENTS

| | | |
|---|---|---|
| 5,930,807 A | 7/1999 | Ebrahim et al. |
| 6,226,653 B1 * | 5/2001 | Alpern et al. ............... 707/206 |

OTHER PUBLICATIONS

Andrew W. Appel, "Simple Generational Garbage Collection and Fast Allocation, " Software: Practice and Experiences, 19(2): 171–183, Feb. 1989.

Hosking et al., "A Comparative Performance Evaluation of Write Barrier Implementations, " ACM Conference on Object–Oriented Programming Systems, Languages, and Applications, pp. 92–109 Oct. 1992.

Urs Holzle, "A Fast Write Barrier for Generational Garbage Collectors, " OOPLSA '93 Garbage Collection Workshop, Oct. 1993.

Agesen et al., "Garbage Collection and Local Variable Type–Precision and Liveness in Java™ Virtual Machines," Programming Language Design and Implementation, Jun. 1998.

* cited by examiner

Primary Examiner—Kim Vu
Assistant Examiner—Hung Pham

(57) ABSTRACT

A method and apparatus are disclosed for efficiently creating and maintaining a remembered set in a generational garbage collection scheme using a write buffer and a barrier bit associated with each object. A barrier bit associated with each object differentiates generations in a generational garbage collection scheme. When an object is first created, the barrier bit of the object is set to zero. The barrier bit is set when the object becomes old, for example, after surviving a first garbage collection. The barrier bit is used to determine whether to make an entry into a write buffer when a reference to another object is stored into an object. An entry is made in the write buffer only if the barrier bit of the object that is written into is set. At the end of each garbage collection, entries in the write buffer are added to the remembered set for the next garbage collection if the objects satisfy the criterion for membership, i.e., they are live and may contain pointers to objects in a younger generation. Thus, the remembered set consists of objects that were in the write buffer at the time of a garbage collection, that must be remembered for the next garbage collection. The write buffer is kept small by eliminating duplicate entries. The present invention turns off the barrier bit after the first store during each reclamation period (which causes the object to be identified in the write buffer). The barrier bit is turned on again by the garbage collector after the write buffer has been processed.

38 Claims, 7 Drawing Sheets

METHOD AND APPARATUS FOR PERFORMING GENERATIONAL GARBAGE COLLECTION USING BARRIER BITS

Cross Reference to Related Applications

The present invention is related to U.S. patent application Ser. No. 09/480,190, now U.S. Pat. No. 6,226,653 entitled "Method And Apparatus For Performing Generational Garbage Collection Using Remembered Set Counter," and U.S. patent application Ser. No. 09/480,186, entitled "Method And Apparatus For Performing Generational Garbage Collection Using Middle-Aged Objects," filed contemporaneously herewith, assigned to the assignee of the present invention and incorporated by reference herein.

FIELD OF THE INVENTION

The present invention relates generally to garbage collection mechanisms that automatically recover memory that is no longer in use by an operating system nor application programs in a computer system, and more particularly to a system and method for reducing computational overhead associated with such garbage collection mechanisms.

BACKGROUND OF THE INVENTION

Modern programming systems that support object-oriented data models often provide automatic storage management, thereby freeing the programmer from the requirement of explicitly requesting storage for data from the system, and, more importantly, offering storage when it is no longer needed. The latter requirement has historically been the source of many and the most troublesome program bugs. Automatic recovery of storage no longer in use is often referred to as garbage collection.

Garbage collection is a complex topic that has been the subject of many technical articles and at least one text book. The following is a simplified explanation of dynamic memory allocation and garbage collection. For a more detailed discussion of basic garbage collection technology, see, for example, Richard Jones and Rafael Lins, "Garbage Collection," John Wiley & Sons Ltd., 1996, U.S. Pat. No. 5,088,036, and U.S. Pat. No. 5,930,807, all of which are incorporated by reference in their entirety.

Referring to FIG. 1, there is shown a typical computer system 100 having a central processing unit (CPU) 102, user interface 106, and main memory 108. The main memory 108 stores an operating system 110 and one or more application programs 112 (one shown). The operating system 110 and application programs 112 comprise processes (also called threads or tasks) that include program code and data (such as constants, local variables and other parameters) used in the execution of the program code. In addition, the main memory 108 stores at least one heap 116 used for dynamic memory allocation. The space in main memory 108 allocated to store the operating system 110, application programs 112, and the heap 116 need not be contiguous. For example, pages or possibly larger contiguous chunks of main memory can be typically linked together using tables or other well known prior art mechanisms.

The program code and data stored in main memory 108 refers to objects. The term "object" is herein defined to mean any data structure created by a process. The heap 116 stores such objects. More specifically, when a process spawns an object, a memory allocation routine 118 in the operating system is called. The memory allocation routine 118 responds by allocating a region in the heap 116 for storing the object.

The representation of the object in the heap may vary. In object-oriented programming systems, for example, an object typically contains the variables declared in the object's class and all of the object's super classes. It should be noted that the heap 116 may store additional information related to the objects, the details of which are not relevant to the present invention.

The program code and associated data stored in main memory 108 use a reference to point to the representation of a given object in the heap 116. Such a reference is referred to herein as an "object reference." The object reference may be direct or indirect. A direct object reference identifies the location in main memory for the object (for example, the location in main memory of the header of the object). On the other hand, an indirect object reference points to an object handle, which can be used to locate the location in main memory for the object. In this document, the term object reference refers to both direct and indirect object references.

The memory allocation routine 118 discussed above may occur repeatedly. Clearly, if this routine continued unabated, all of the space in the heap 116 would be exhausted. Therefore, space in the heap 116 must be restored by either explicit action of the program, or some other mechanism.

The solution to this problem is to recover blocks of memory space in the heap 116 that are no longer being used by the active processes. Garbage collection is a term that refers to automatic methods of recovering unused memory in the heap 116. Garbage collection is based on the fact that if no pointer to a heap object exists anywhere in the executing environment of a program, the object can never again be accessed and therefore the storage occupied by the object can be reused for another object. Garbage collection comprises the identification of all reachable objects, i.e., those that can be accessed by the executing program. All reachable objects are identified by marking all objects pointed to by the roots of a programs (i.e., local variables and static variables) and all objects pointed to by objects pointed to by roots, recursively, until all reachable objects have been identified. Reached objects are considered "live" and are kept. Objects which are not reached are considered "dead" and their storage space is made available for future allocations.

A garbage collection routine 120 typically gathers and recovers unused memory upon the occurrence of a pre-defined event, such as the expiration of a predetermined time period or the available heap memory reaches a predefined threshold. A large number of different garbage collection methodologies have been proposed. For a discussion of the state of the art, see, for example, Jones and Lin, "Garbage Collection," John Wiley and Sons Ltd, 1996, incorporated by reference in its entirety above.

One way to make garbage collection more efficient, and to reduce the length of system pauses caused by garbage collection, is to reduce the number of objects that need to be processed during a given garbage collection cycle using a generational garbage collection scheme. Generational schemes are based on the observations that most objects have short lifetimes, dying shortly after they are allocated, and that objects which do not die quickly and have been reachable for some time will continue to be reachable (i.e. live). Generational schemes partition the objects in the heap into groups called "generations," based upon the ages of the objects, where an object's age is typically measured in terms of the number of garbage collections that the object has survived. For this discussion, consider two generations, a "young" generation of recently allocated objects, and an "old" generation of objects which have survived some minimum number of collections. Typically, the young generation is much smaller than the older generations.

Generational schemes perform frequent collections of the young generation, and only occasionally do full collections of the entire heap. Typically, generational schemes perform a minor garbage collection upon the occurrence of a predefined event (such as the expiration of a predetermined time period or the available heap memory reaches a predefined threshold). The minor garbage collection routine identifies younger generation objects that are not reachable from the objects stored in the heap, and identifies the space in the heap previously allocated to one or more of these objects as a candidate for reclamation. Less frequently, a major garbage collection routine is performed that identifies all objects that are not reachable from the objects stored in the heap, and identifies the space in the heap previously allocated to one or more of these objects as a candidate for reclamation FIG. 2 shows a system in which the heap 116 has been logically divided into three generations: Generation 0 stores the youngest objects, Generation 1 stores objects that have persisted for at least N garbage collection cycles (where N is typically a value between 1 and 4), and Generation 2 stores the oldest objects in the system. The simplest policy is to advance all live objects from one generation to the next oldest generation each time a generational garbage collection is performed. Another technique is to divide the youngest generation into an object creation space and an aging space. Objects are initially allocated in the creation space. The aging space holds survivors from the creation space. Objects are promoted to the next older generation only after surviving N garbage collection cycles.

One of the biggest problems with generational garbage collectors is handling inter-generation object references whereby the only reference(s) to an object in one generation may be stored in object(s) in another generation. FIG. 2 shows a number of inter-generational references 170. If the only reference to an object is an inter-generational reference, or more generally, if the only path from a root set reference to an object requires traversal of an inter-generation object reference, the object would be improperly deleted by the garbage collection routine unless all inter-generational references were taken into account during garbage collection. However, scanning the older generation heap areas for inter-generational references each time a younger generation heap area is garbage collected would take away some of the efficiency achieved by using generational garbage collection.

If scanning older generations during collection of younger generations is ruled out as too inefficient, then another mechanism has to be developed to keep track of references in older generation objects that point to newer generation objects. One such mechanism utilizes a "remembered set" that identifies (for example, by storing a pointer to) each older generation object that contains a reference to a younger generation object. In this scheme, at every store operation, a software procedure (typically referred to as a "write barrier") ensures that the updated location is stored in the remembered set if the store creates a reference from an older generation object to a younger generation object.

The remembered set is obtained by monitoring, by software or hardware means, the execution of the processes in such away that all stores of pointers to new objects into old objects can be discovered. Such old objects become members of the remembered set, which is used during the next and subsequent minor garbage collections.

More specifically, in the next and subsequent minor garbage collections, the members of the remembered set are treated as part of the root set of object references from which the set of reachable younger generation objects is generated. Those younger generation objects that are not part of this set are identified as younger generation objects that are not reachable from the objects stored in the heap, and the space in the heap previously allocated to one or more of these unreachable objects is identified as a candidate for reclamation.

Various schemes have been proposed to monitor stores into old objects so that they can be identified and the remembered set updated accordingly. The modified old objects are scanned to determine if they contain pointers to young objects. Recording the information must be as efficient as possible, and as precise as possible. This forces one to make a tradeoff between efficiency and preciseness.

One traditional way of identifying stores into old objects is referred to as "card marking," wherein the heap is divided into fixed-size subsets and associated with each subset is a "card," i.e., a storage location. On every store into the portion of the heap that contains old objects, the card associated with the heap address stored into is marked. At collection time, the entire heap subset associated with all marked cards is scanned for pointers to new objects. A more detailed description of exemplary card marking schemes is set forth in Paul R. Wilson and Thomas G. Moher, "A Card-Marking Scheme for Controlling Intergenerational References in Generation-Based GC on Stock Hardware," SIGPLAN Notices 24(5), pp. 87–92 1989, and Urs Holzle, "A Fast Write Barrier for Generational Garbage Collectors," presented at OOPLSA '93 Garbage Collection Workshop, Washington, D.C., October, 1993, available at http://www.sunlabs.com/research/self/papers/write-barrier.html, hereinafter incorporated by reference in their entirety.

The card marking scheme is efficient in two ways. First, the card marking is accomplished by a small number of shifts to find the card to be marked, and one store. In addition, if multiple stores into the same card are performed, at collection time the associated heap subset is scanned only once. However, at collection time, the entire heap subset for each marked card must be scanned rather than just the (possibly) one object stored into. In addition, some scheme for finding object boundaries in the heap is required, or else the scan must be conservative. The executing code may or may not be able to distinguish efficiently between stores of object pointers and stores of scalar values, in which case more cards will be marked than necessary. This effect always happens when the monitoring is done by hardware memory protection mechanisms, as it is in some proposals. Thus, in summary, the card marking imposes too much of a burden on the collection process in the interest of minimizing the cost for the first store of required information.

As an alternative to card marking, one can accumulate a buffer of pointers to objects which have been modified, and, more particularly, objects that have been modified by stores of pointers. The buffer may include the values stored as well as the addresses of the objects stored into. An exemplary buffer scheme is described in detail in "A Comparative Performance Evaluation of Write Barrier Implementations," Antony L. Hosking, J. Eliot B. Moss and Darko Stefanovic, Proc. of the ACM Conference on Object-Oriented Programming Systems, Languages, and Applications, pp. 92–109 (Vancouver, Canada, October 1992). ACM SIGPLAN Notices 27(10), October 1992, available at http://osl-www.cs.umass.edu/, herein incorporated by reference in its entirety.

Compared to card marking, the buffer scheme is more costly to record, but is more precise. However, the buffer may become too large, because of duplicate entries (the same object being stored into more than once), and especially because of unnecessary recording of stores into young objects.

Thus, there remains a need in the art to provide a garbage collection mechanism that builds write buffer entries efficiently in two respects. First, the write buffer should not contain any more entries than necessary. Second, the mechanism for storing entries into the write buffer should be as efficient as possible. In addition, the data recorded in the write buffer should be in a form convenient for the collector to process.

SUMMARY OF THE INVENTION

Generally, a method and apparatus are disclosed for efficiently creating and maintaining a remembered set in a generational garbage collection scheme using a write buffer and a barrier bit associated with each object. The present invention uses the barrier bit to determine whether to make an entry into a write buffer when a reference to another object is stored into an object. An entry is made in the write buffer only if the barrier bit of the object that is written into is set. At the end of each garbage collection, entries in the write buffer are added to the remembered set for the next garbage collection if the objects satisfy the criterion for membership, i.e., they are live and may contain pointers to objects in a younger generation. Thus, the remembered set consists of objects that were in the write buffer at the time of a garbage collection, that must be remembered for the next garbage collection.

According to one aspect of the invention, a barrier bit is associated with each object to differentiate generations in the generational garbage collection scheme. The barrier bit serves to minimize the membership of the remembered set. When an object is first created, the barrier bit of the object is set to zero. The barrier bit is set to one when the object becomes old. In the illustrative embodiment, the barrier bit is turned on when an object first survives a garbage collection and thereby distinguishes the youngest generation from all other generations.

According to another aspect of the invention, the write buffer is kept small by eliminating duplicate entries. The present invention turns off the barrier bit after the first store during each reclamation period (which causes the object to be identified in the write buffer). The barrier bit is turned on again by the garbage collector after the write buffer has been processed.

A more complete understanding of the present invention, as well as further features and advantages of the present invention, will be obtained by reference to the following detailed description and drawings.

DETAILED DESCRIPTION OF PREFERRED EMBODIMENTS

Figure 1:
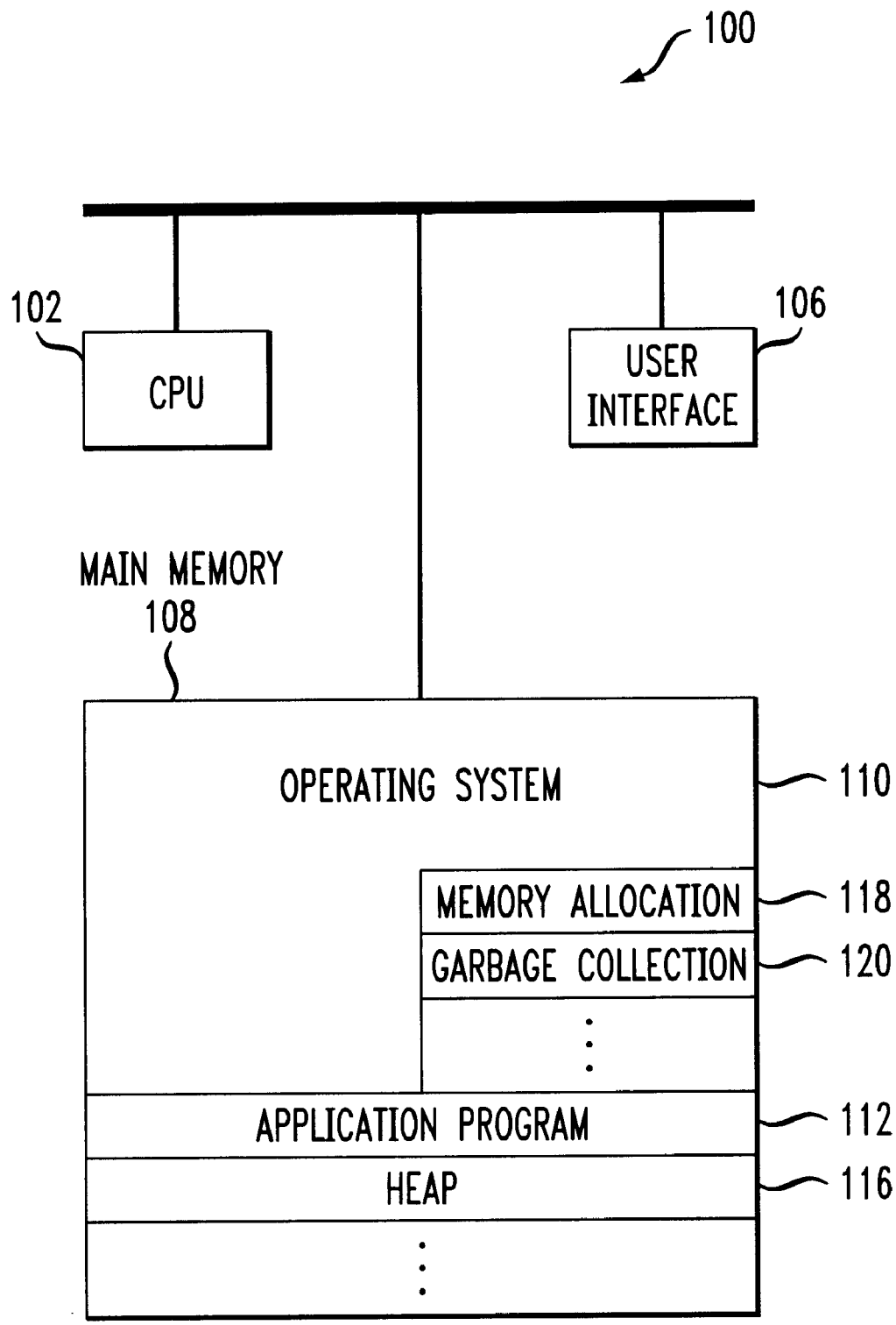
FIG. 1 is a block diagram of a computer system that utilizes a conventional garbage collection mechanism for recovery of memory space used by inaccessible objects.
Figure 2:
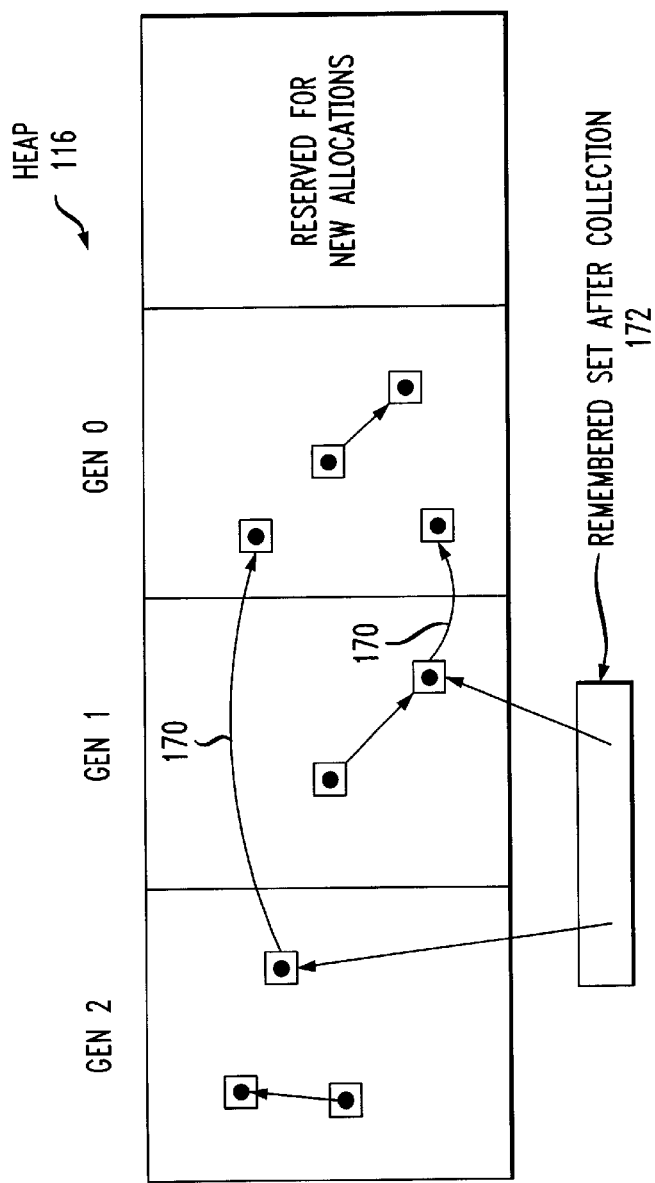
FIG. 2 is a block diagram of a memory heap used for storing objects in a conventional generational garbage collection system.

The present invention may be embodied using the basic system architecture described above in conjunction with FIG. 1 and the generational heap structure discussed above in conjunction with FIG. 2, as modified herein to incorporate the features and functions of the present invention. The present invention utilizes a write buffer to efficiently create and maintain the remembered set in a generational garbage collection scheme. Entries in the write buffer are used as part of the root set for the next garbage collection. Specifically, at the end of each garbage collection, entries in the write buffer are added to the remembered set for the next garbage collection if the objects satisfy the criterion for membership, i.e., they are live and may contain pointers to objects in a younger generation. Thus, the remembered set consists of objects that were in the write buffer at the time of a garbage collection, that must be remembered for the next garbage collection.

According to one feature of the present invention, membership of the remembered set is kept low using a barrier bit associated with each object to differentiate generations in the generational garbage collection scheme. In one illustrative embodiment, the barrier bit is turned on when an object first survives a garbage collection. The barrier bit is used by the present invention to decide whether to make an entry into a write buffer when a reference to another object is stored into an object. An entry is made in the write buffer only if the barrier bit of the object that is written into is set. Thus, the write buffer contains a list of "old" objects that potentially point to younger objects.

The write buffer reduces the scan time during a garbage collection phase by identifying the specific old objects to be scanned, rather than the regions of the heap to be scanned that are identified with card-marking schemes. In this manner, the write buffer allows exact scanning of specific objects requiring a scan, rather than a conservative scanning of the heap regions or requiring arbitrary portions of the heap to be scanned for object boundaries.

The write buffer is kept small by eliminating duplicate entries. Specifically, the barrier bit is turned off by the present invention after the first store, and turned on again by the garbage collector when it processes the write buffer.

BARRIER BIT

Figure 3:
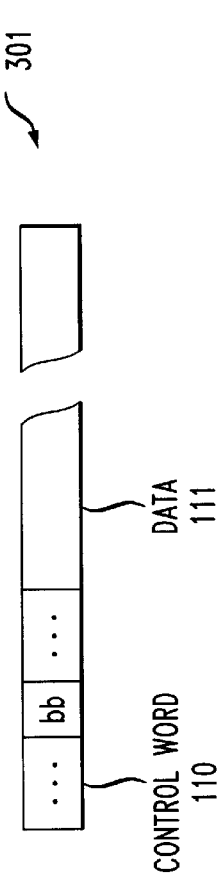
FIG. 3 is a diagram of an object in a heap, including the object's barrier bit in accordance with the present invention.

Generally, the present invention provides a method for recording stores of object references into old objects. As shown in FIG. 3, each object 301 has an associated barrier bit (bb). The object 301 includes a control word 110 and object data 111. In the illustrative embodiment, the barrierbit (bb) is part of the control word 110 of the object 301. While the control word 110 and object data 111 are illustrated in FIG. 3 as contiguous in the heap, the control word 110 may be separate from the object data 111, as would be apparent to a person of ordinary skill in the art. In an alternate implementation, control words 110 for objects 301 are kept in a portion of the heap 116 reserved for them, and data fields are elsewhere.

When an object 301 is first created, the barrier bit (bb) of the object 301 is set to 0. When the object 301 becomes old its barrier bit (bb) is set to 1. In the illustrative embodiment, discussed below, the barrier bit of an object 301 is set after the object survives its first garbage collection.

WRITE BUFFER MAINTENANCE

Figure 4:
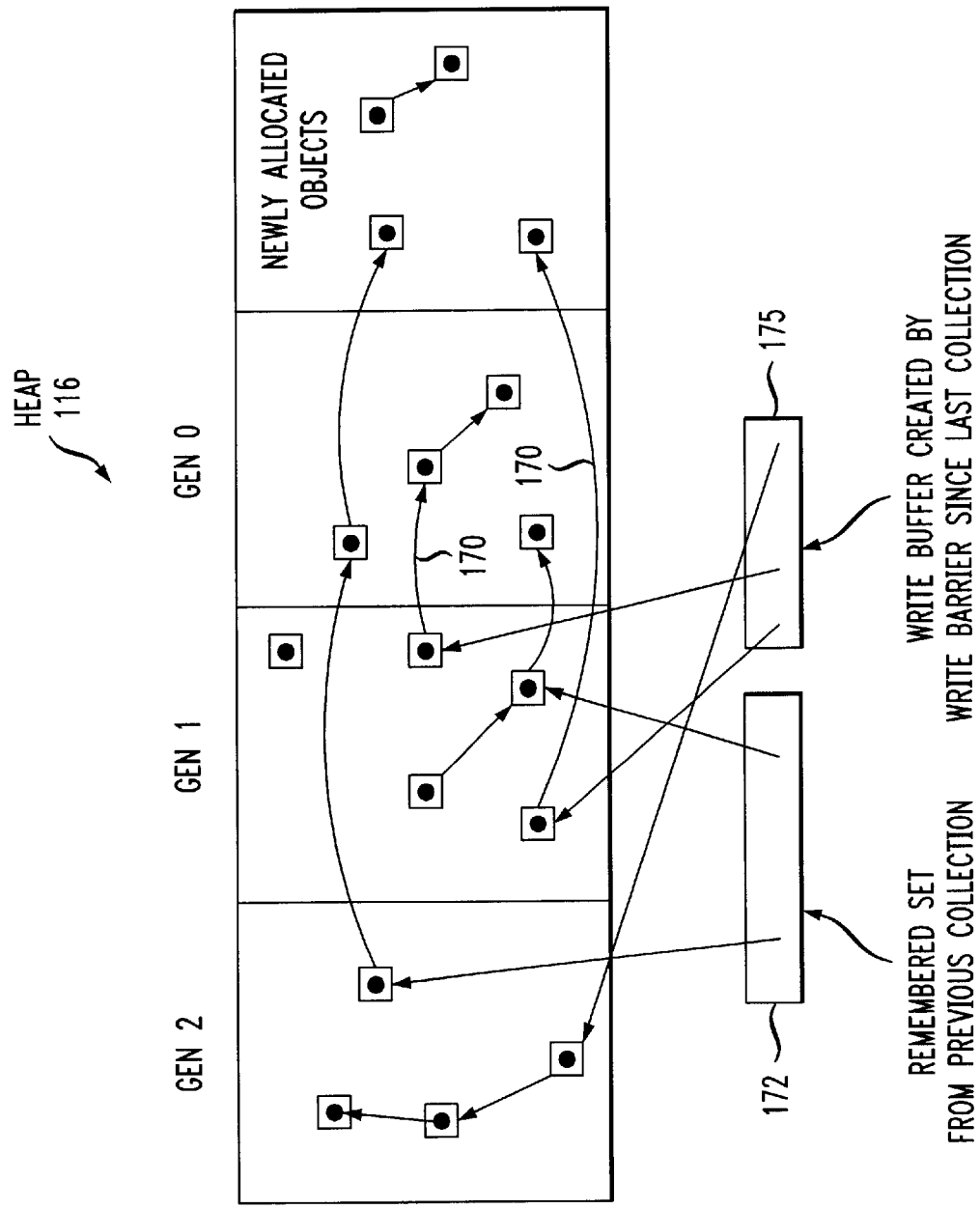
FIG. 4 illustrates the contents of the heap, the remembered set, and the write buffer during the operation of a system embodying this invention, including relevant intergenerational pointers.

FIG. 4 shows a system according to the present invention in which the heap 116 has been logically divided into three generations: Generation 0 stores the youngest objects, Generation 1 stores objects that have persisted for at least N garbage collection cycles (where N is typically a value between 1 and 4), and Generation 2 stores the oldest objects in the system. Thus, as previously indicated, the barrier bit for all objects in generations 1 and 2 will be set.

As shown in FIG. 4, the present invention utilizes a write buffer 175 to monitor all old objects that have had a reference to another object stored in them since the last garbage collection. The remembered set 172 from the previous garbage collection cycle identifies each older generation object that contains a reference to a younger generation object. As discussed further below in conjunction with FIG. 6, objects in the write buffer 175 are candidates for the remembered set 172

Figure 5:
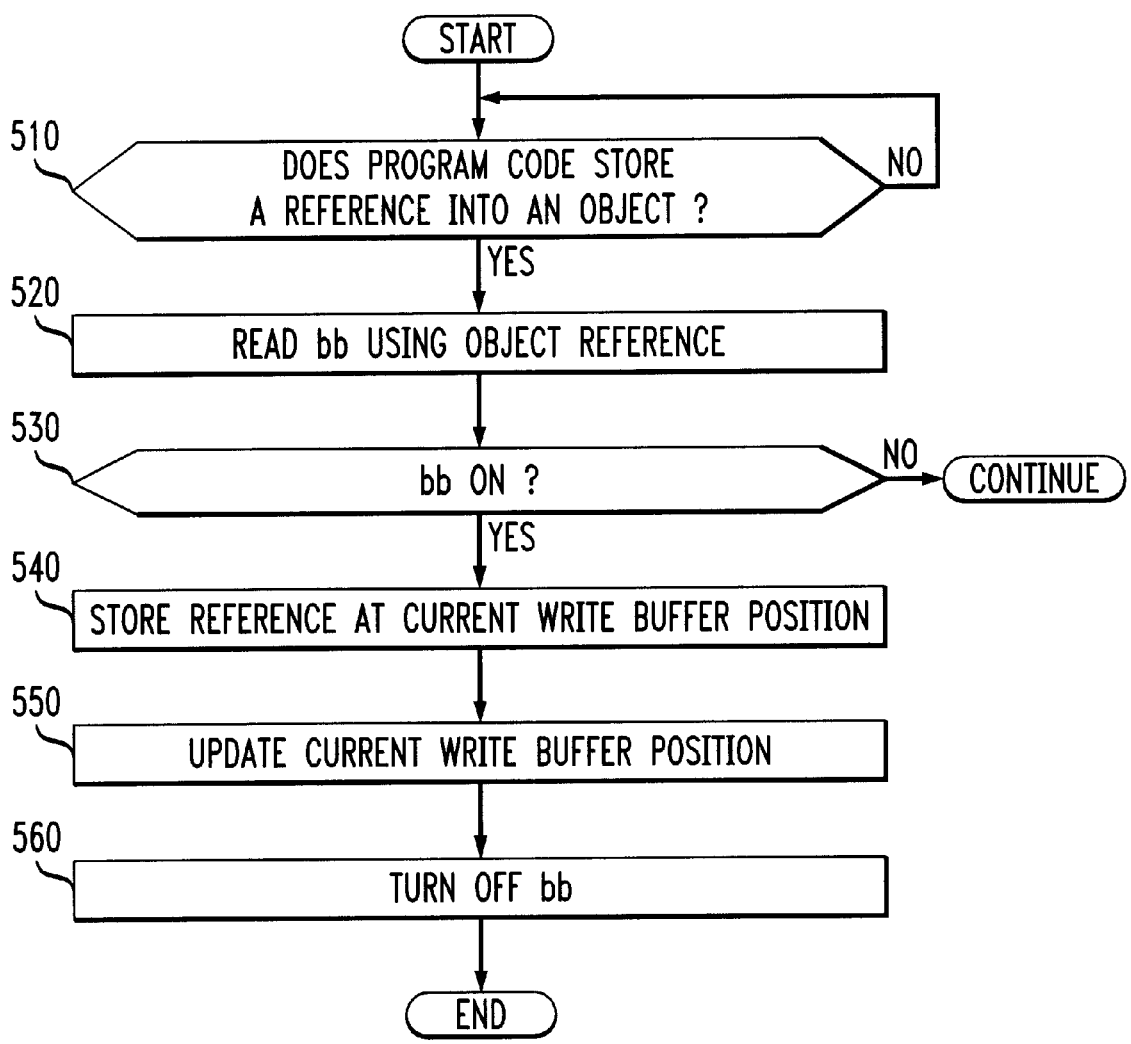
FIG. 5 is a flow chart illustrating the processing of program code that stores an object reference into an object field to support efficient generational garbage collection according to the present invention.

FIG. 5 is a flow chart describing a barrier write process 500 that incorporates features of the present invention. The barrier write process 500 is initiated each time program code 112 stores a reference into an object. The storage of a reference into an object can be detected by hardware or software means, in a known manner. In the illustrative embodiment shown in FIG. 5, the barrier write process 500 continuously monitors all executing program code 112 during step 510 until the process detects that program code is storing a reference into an object.

Once the barrier write process 500 detects that program code is storing a reference into an object, program control proceeds to step 520 where the value of the barrier bit is obtained for the object. A test is performed during step 530 to determine if the barrier bit has been set. If it is determined during step 530 that the barrier bit has not been set, then the object is still a young object, or an old object that has already been recorded in the write buffer and had its barrier bit turned off during step 560 (see below) on a previous execution of the barrier write process 500, and not a candidate for storage in the write buffer 175.

If, however, it is determined during step 530 that the barrier bit has been set, then the object is an old object, and the reference stored into the old object is potentially to a younger object. Thus, a reference to the object is stored at the current write buffer position during step 540 and the current write buffer position is updated during step 550. In the illustrative embodiment, the write buffer 175 has a simple structure. The write buffer 175 may be stored into by appending to the end of the write buffer 175, and updating the pointer to the next sequential entry of the write buffer 175. In architectures such as IBM PowerPC, commercially available from IBM Corp. of Armonk, N.Y., this can be done with a single "store and update" instruction.

In order to prevent duplicate entries for the current object in the write buffer 175, for example, due to additional references before the next garbage collection, the barrier bit for the object is set to zero during step 560 before program control terminates. In this manner, subsequent stores into the object before the next garbage collection will not cause an additional entry in the write buffer 175.

GARBAGE COLLECTION PHASE

Figure 6:
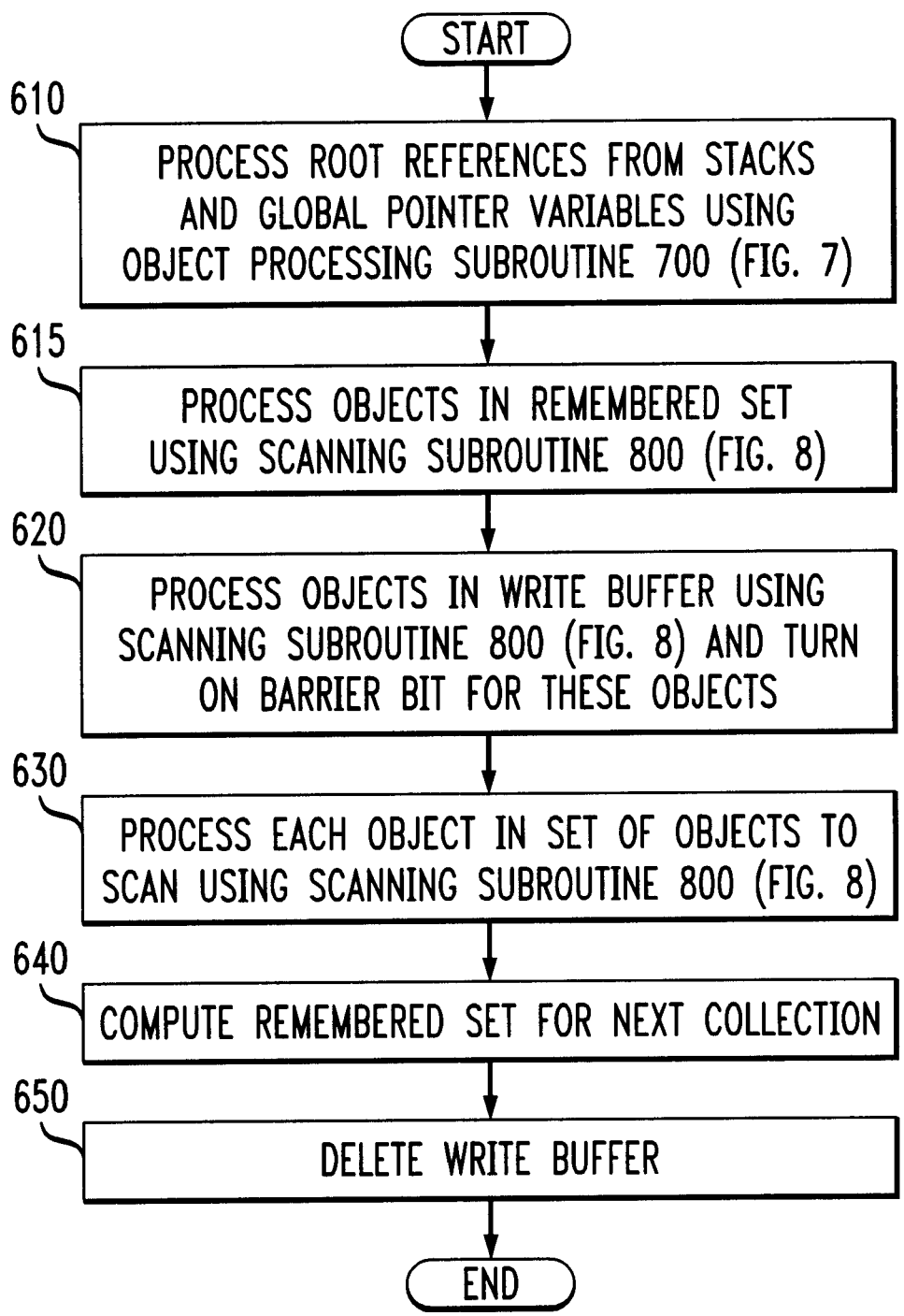
FIGS. 6 through 8 are flow charts illustrating the garbage collection process and related subroutines incorporating features of the present invention.
Figure 7:
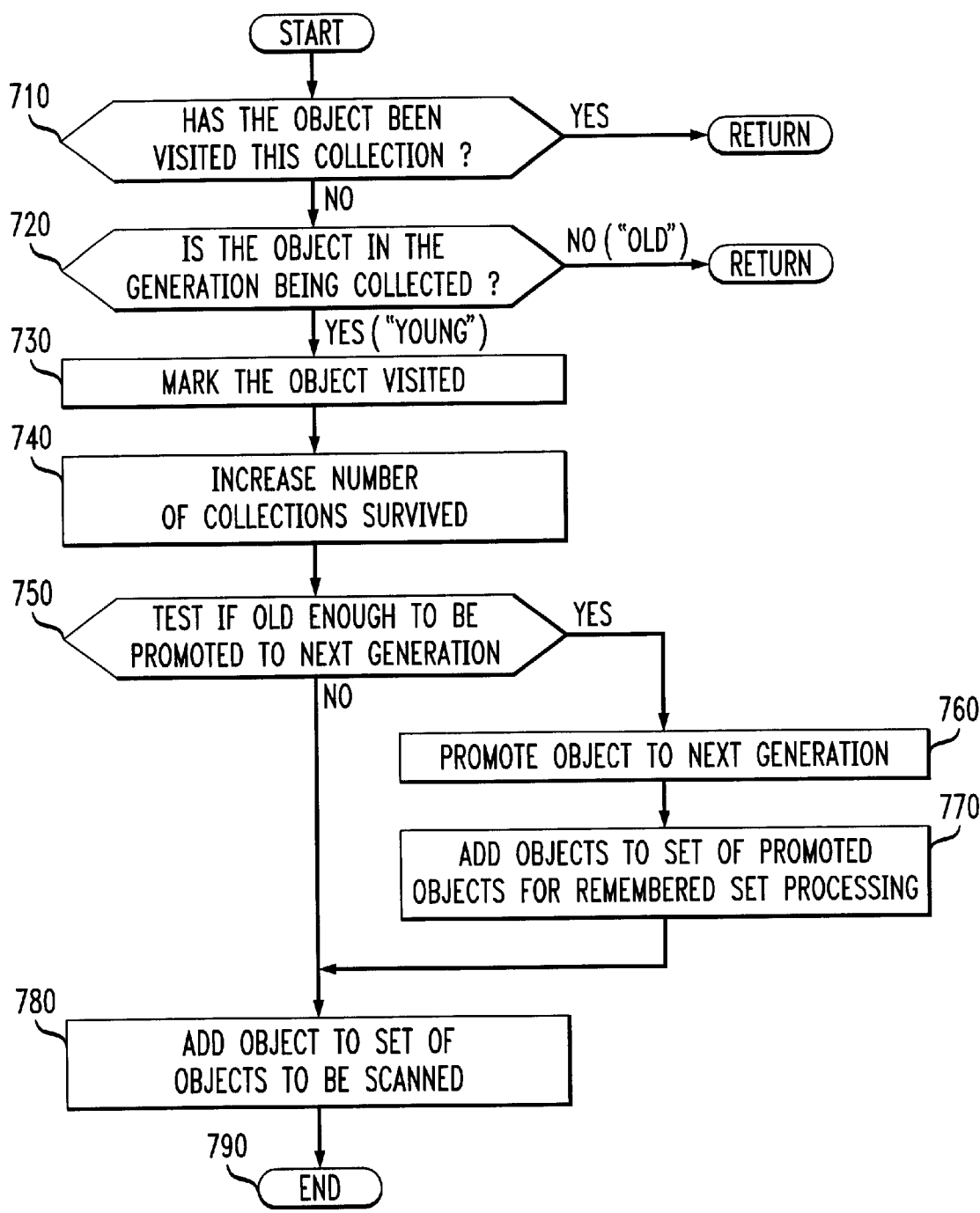
Figure 8:
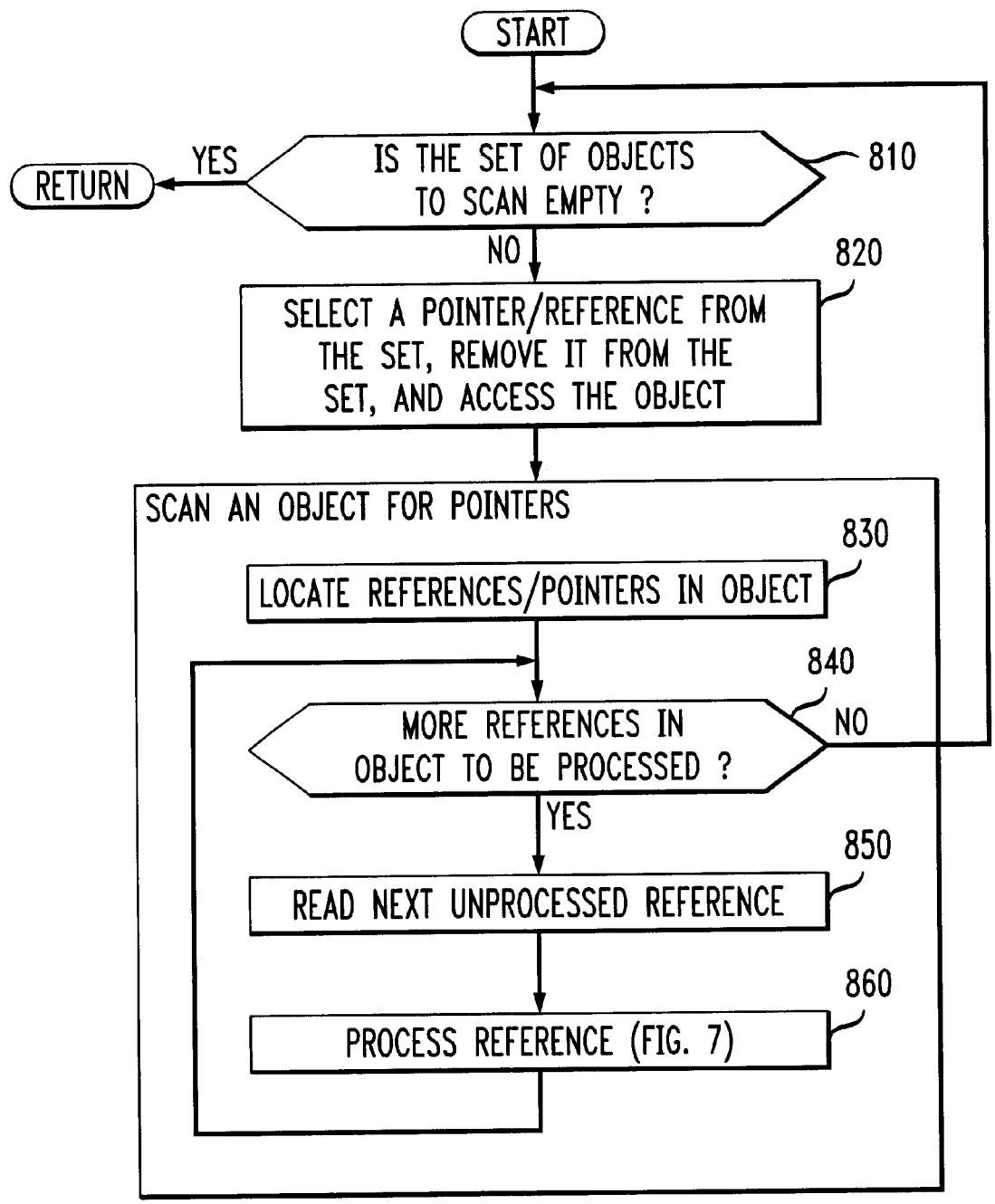

FIGS. 6 through 8 are flow charts describing various processes that are active during the garbage collection phase. As previously indicated, the present invention employs a generational garbage collection scheme that executes mostly minor collections, with occasional major collections chosen according to some algorithm. A minor collection is one during which the space only of young objects which have become garbage is collected. A major collection is one during which the space of all objects which have become garbage is collected.

FIG. 6 is a flow chart describing an exemplary garbage collection process 600 in accordance with the present invention. As shown in FIG. 6, the garbage collection process 600 initially processes all of the root references during step 610 from the stacks and global pointer variables using an object processing subroutine 700, discussed further below in conjunction with FIG. 7. Generally, the object processing subroutine 700 identifies those objects that must be processed during the garbage collection and creates a set of objects to be scanned.

A root pointer is a memory location of a program which is not contained in an object, but which contains a reference to an object. Such memory locations are statically allocated as part of the program text, and are referred to as "statics," or are local variables of program procedures (methods in the object-oriented literature), allocated and freed on the execution stack of the program. Root pointers are typically updated as the program executes. A root object or "root" is an object that is pointed to by a root pointer. The root pointers and objects are identified, for example, using the stacks containing local thread storage and global pointer variables and by scanning objects in the remembered set 172 and the write buffer 175. For a more detailed discussion of the identification of root pointers and objects, see, for example, Jones and Rafael Lins, "Garbage Collection," 4, 37, 62 and 228, John Wiley & Sons Ltd., 1996, incorporated by reference herein. The root objects and all objects pointed to by root objects are known to be live.

The objects in the remembered set 172 are processed during step 615 using the scanning subroutine 800, discussed further below in conjunction with FIG. 8. Generally, the scanning subroutine 800 recursively processes each root object and all objects pointed to by a root object in a chain until all objects have been scanned.

Thereafter, the objects in the write buffer 175 are processed during step 620 using the scanning subroutine 800 (FIG. 8), and the barrier bit for these objects is turned on. Each object that was placed in the set of objects to be scanned by the object processing subroutine 700 is processed during step 630 by the scanning subroutine 800.

The remembered set 172 is then computed during step 640 for the next garbage collection. As previously indicated, entries in the write buffer 175 are added to the remembered set 172 for the next garbage collection if the object satisfies the criterion for membership, i.e., the objects contain pointers to objects in a younger generation. Thus, the remembered set 172 consists of objects that were in the write buffer 175 at the time of a garbage collection, that must be remembered for the next garbage collection. Thus, the remembered set 172 is processed during step 640 to remove existing entries that no longer qualify, remove entries for collected objects, remove duplicate entries, insert promoted objects that qualify, as discussed in conjunction with FIG. 7, and to insert the write buffer 175 objects that qualify.

Finally, the write buffer 175 is deleted during step 650, before execution of the garbage collection process 600 terminates.

As previously indicated, the garbage collection process 600 executes an object processing subroutine 700 during step 620 to identify those objects that must be processed during the garbage collection and to create a set of objects to be scanned. The object processing subroutine 700 initially performs a test during step 710 to determine if the current object has previously been visited on this garbage collection. If it is determined during step 710 that the current object has previously been visited on this garbage collection, then program control returns to the calling function.

If, however, it is determined during step 710 that the current object has not previously been visited on this garbage collection, then a further test is performed during step 720 to determine if the object is in the current generation being collected. Thus, the garbage collection process 600 will bypass the old objects here and only process those old objects that appear in the write buffer 175 and remembered set 172 (since they potentially point to a young object). Thus, if it is determined during step 720 that the current object is an old object, then program control returns to the calling function.

If, however, it is determined during step 720 that the current object is a young object, then the object is processed during steps 730 through 780. Specifically, the object is marked as visited during step 730 and the number of collections survived for the object is incremented during step 740, each in a well-known manner. A test is then performed during step 750 to determine if the object is old enough to be promoted to the next generation. As previously indicated, the illustrative embodiment promotes all objects to the old generation once they survive N garbage collections. If it is determined during step 750 that the object is old enough to be promoted, then the object is promoted to the next generation during step 760. It is noted that the barrier bit was already set for this object during step 715. The object is then added to the set of promoted objects for remembered set processing (FIG. 6, Step 640, discussed above) during step 770.

Finally, the object is added to the set of objects to be scanned by the scanning process 800 during step 780 before program control returns to the calling function during step 790.

As previously indicated, the garbage collection process 600 executes a scanning subroutine 800 during step 630 to scan a set of objects to be scanned. The scanning subroutine 800 recursively processes each root object and all objects pointed to by a root object in a chain until all objects have been scanned. The scanning subroutine 800 initially performs a test during ste 810 to determine if the set of objects to be scanned is empty. If it is determined during step 810 that the set of objects to be scanned is empty, then processing of the scanning subroutine 800 is complete and program control returns to the calling function.

If, however, it is determined during step 810 that the set of objects to be scanned is not empty, then additional objects remain to be scanned and a pointer or reference is selected from the set during step 820. The pointer is removed from the set and the object is accessed. Thereafter, the scanning subroutine 800 will scan the object and all objects pointed to by the object during steps 830 through 860, recursively.

Thus, all references and points in the current object are obtained during step 830. Thereafter, a test is performed during step 840 to determine if there are more references in the current object to be processed. If it is determined during step 840 that there are no more references in the current object to be processed, then program control returns to step 810 and continues in the manner described above.

If, however, it is determined during step 840 that there are more references in the current object to be processed, then the next unprocessed reference is obtained during step 850 and is processed during step 860 using the object processing subroutine 700, discussed above. Thereafter, program control returns to step 840 and continues in the manner described above.

In this manner the garbage collection process 600 and related subroutines 700, 800 will process all young objects, as well as the specific old objects requiring a scan. Specifically, the garbage collection process 600 will process only those old objects that appear in the write buffer 175 and remembered set 172 (since they potentially point to a young object).

As previously indicated, a major garbage collection is one during which the space of all objects which have become garbage is collected. Major garbage collections are outside the scope of the present invention. For a more detailed discussion of major garbage collections, see, for example, U.S patent application entitled "Method And Apparatus For Performing Generational Garbage Collection Using Remembered Set Counter," (Attorney Docket Number YO999-452) and U.S. patent application entitled "Method And Apparatus For Performing Generational Garbage Collection Using Middle-Aged Objects," (Attorney Docket Number YO999-453), filed contemporaneously herewith, assigned to the assignee of the present invention and incorporated by reference herein above.

It is to be understood that the embodiments and variations shown and described herein are merely illustrative of the principles of this invention and that various modifications may be implemented by those skilled in the art without departing from the scope and spirit of the invention.

What is claimed is:

1. In a computer system comprising a heap that stores a plurality of objects that are logically partitioned into at least a first set of objects and a second set of objects distinct from said first set of objects, wherein the computer system further includes a remembered set and wherein the computer system performs a plurality of reclamation operations that use the remembered set to reclaim space in the heap, a method for maintaining the remembered set comprising the steps of:

storing the remembered set from the last reclamation operation;

storing a table of entries between each reclamation operation, wherein each entry identifies a given object that belongs to said first set of objects and includes an object reference that has been modified since the last reclamation operation;

selecting from the table at least one entry corresponding to an object, O; and updating the remembered set to identify the object, O, corresponding to the selected at least one entry, and storing the updated remembered set for the next reclamation operation.

2. The method of claim 1, wherein at least one entry of the table uniquely identifies a given object that includes an object reference to at least one object in the second set of objects.

3. The method of claim 1, wherein said remembered set identifies objects in the first set that contain an object reference to objects in the second set.

4. The method of claim 3, wherein said updating step further comprises the step of creating an entry in said remembered set only for objects in the first set that contain an object reference to objects in the second set.

5. The method of claim 3, wherein said updating step further comprises the step of creating an entry in said remembered set for all objects in the first set.

6. The method of claim 1, further comprising the step of setting a barrier bit associated with a given object when said object is promoted to said first set.

7. The method of claim 6, wherein said barrier bit is turned off after a first storage of a given object in said table of entries during a given reclamation period.

8. A method for managing a remembered set in a generational garbage collection system that stores a plurality of objects that arc logically partitioned into at least a first set of objects and a second set of objects distinct from said first set of objects, said method comprising the steps of:

setting a barrier bit associated with a given object when said object is promoted to said first set; and storing said given object in a table of entries if said barrier bit is set and an object reference is stored in said given object, wherein said table of entries is a data structure distinct from said remembered set.

9. The method of claim 8, wherein at least one entry of the table uniquely identifies a given object that includes an object reference to at least one object in the second set of objects.

10. The method of claim 8, further comprising the step of updating a remembered set to identify an object, O, that includes an object reference to at least one object in the second set and storing the updated remembered set for the next reclamation operation.

11. The method of claim 8, further comprising the step of updating a remembered set to identify all objects in said table and storing the updated remembered set for the next reclamation operation.

12. The method of claim 8, wherein said barrier bit is turned off after a first storage of a given object in said table of entries during a given reclamation period.

13. The method of claim 8, wherein said object is promoted to said first set after said object survives a first reclamation operation.

14. A method for managing a remembered set in a generational garbage collection system that stores a plurality of objects that are logically partitioned into at least a first set of objects and a second set of objects distinct from said first set of objects, said method comprising the steps of:

storing said remembered set from the last reclamation operation;

storing a given object in a table of entries between each reclamation operation if a barrier bit associated with said object indicates that said given object is in said first set and an object reference is stored in said given object;

identifying objects to be processed for said reclamation operation using said table; and updating the remembered set for the next reclamation operation with entries from said table.

15. The method of claim 14, wherein at least one entry of the table uniquely identifies a given object that includes an object reference to at least one object in the second set of objects.

16. The method of claim 14, further comprising the step of updating the remembered set to identify an object, O, that includes an object reference to at least one object in the second set and storing the updated remembered set for the next reclamation operation.

17. The method of claim 14, further comprising the step of updating the remembered set to identify all objects in said table and storing the updated remembered set for the next reclamation operation.

18. The method of claim 14, wherein said barrier bit is turned off after a first storage of a given object in said table of entries during a given reclamation period.

19. A generational garbage collection manager for a remembered set in a system that stores a plurality of objects that are logically partitioned into at least a first set of objects and a second set of objects distinct from said first set of objects, said generational garbage collection manager comprising:

a memory that stores computer-readable code; and a processor operatively coupled to said memory, said processor configured to implement said computer-readable code, said computer-readable code configured to:

store the remembered set from the last reclamation operation;

store a table of entries between each reclamation operation, wherein each entry identifies a given object that belongs to said first set of objects and includes an object reference that has been modified since the last reclamation operation;

select from the table at least one entry corresponding to an object, O; and update the remembered set to identify the object, O, corresponding to the selected at least one entry, and storing the updated remembered set for the next reclamation operation.

20. The generational garbage collection manager of claim 19, wherein at least one entry of the table uniquely identifies a given object that includes an object reference to at least one object in the second set of objects.

21. The generational garbage collection manager of claim 19, wherein said remembered set identifies objects in the first set that contain an object reference to objects in the second set.

22. The generational garbage collection manager of claim 19, wherein said processor is configured to create an entry in said remembered set only for objects in the first set that contain an object reference to objects in the second set.

23. The generational garbage collection manager of claim 19, wherein said processor is configured to create an entry in said remembered set for all objects in the first set.

24. The generational garbage collection manager of claim 19, wherein said processor is configured to set a barrier bit associated with a given object when said object is promoted to said first set.

25. The generational garbage collection manager of claim 24, wherein said barrier bit is turned off after a first storage of a given object in said table of entries during a given reclamation period.

26. A generational garbage collection manager for a remembered set in a system that stores a plurality of objects that are logically partitioned into at least a first set of objects and a second set of objects distinct from said first set of objects, said generational garbage collection manager comprising:

a memory that stores computer-readable code; and a processor operatively coupled to said memory, said processor configured to implement said computer-readable code, said computer-readable code configured to:

set a barrier bit associated with a given object when said object is promoted to said first set; and store said given object in a table of entries if said barrier bit is set and an object reference is stored in said given object, wherein said table of entries is a data structure distinct from said remembered set.

27. The generational garbage collection manager of claim 26, wherein at least one entry of the table uniquely identifies a given object that includes an object reference to at least one object in the second set of objects.

28. The generational garbage collection manager of claim 26, wherein said processor is further configured to update the remembered set to only identify an object, O, that includes an object reference to at least one object in the second set and storing the updated remembered set for the next reclamation operation.

29. The generational garbage collection manager of claim 26, wherein said processor is further configured to update the remembered set to identify all objects in said table and storing the updated remembered set for the next reclamation operation.

30. The generational garbage collection manager of claim 26, wherein said barrier bit is turned off after a first storage of a given object in said table of entries during a given reclamation period.

31. A generational garbage collection manager for a remembered set in a system that stores a plurality of objects that are logically partitioned into at least a first set of objects and a second set of objects distinct from said first set of objects, said generational garbage collection manager comprising:

a memory that stores computer-readable code; and a processor operatively coupled to said memory, said processor configured to implement said computer-readable code, said computer-readable code configured to:

store a given object in a table of entries between each reclamation operation if a barrier bit associated with said object indicates that said given object is in said first set and an object reference is stored in said given object;

identify objects to be processed for said reclamation operation using said table; and update the remembered set for the next reclamation operation with entries from said table.

32. The generational garbage collection manager of claim 31, wherein at least one entry of the table uniquely identifies a given object that includes an object reference to at least one object in the second set of objects.

33. The generational garbage collection manager of claim 31, wherein said processor is further configured to update the remembered set to identify an object, O, that includes an object reference to at least one object in the second set and storing the updated remembered set for the next reclamation operation.

34. The generational garbage collection manager of claim 31, wherein said processor is further configured to update the remembered set to identify all objects in said table and storing the updated remembered set for the next reclamation operation.

35. The generational garbage collection manager of claim 31, wherein said barrier bit is turned off after a first storage of a given object in said table of entries during a given reclamation period.

36. A program storage device readable by a machine, tangibly embodying a program of instructions executable by the machine to perform method steps for managing a generational garbage collection system for a remembered set in a system that stores a plurality of objects that are logically partitioned into at least a first set of objects and a second set of objects distinct from said first set of objects, said method steps comprising:

storing the remembered set from the last reclamation operation;

storing a table of entries between each reclamation operation, wherein each entry identifies a given object that belongs to said first set of objects and includes an object reference that has been modified since the last reclamation operation;

selecting from the table at least one entry corresponding to an object, O; and updating the remembered set to identify the object, O, corresponding to the selected at least one entry, and storing the updated remembered set for the next reclamation operation.

37. A program storage device readable by a machine, tangibly embodying a program of instructions executable by the machine to perform method steps for managing a generational garbage collection system for a remembered set in a system that stores a plurality of objects that are logically partitioned into at least a first set of objects and a second set of objects distinct from said first set of objects, said method steps comprising:

setting a barrier bit associated with a given object when said object is promoted to said first set; and storing said given object in a table of entries if said barrier bit is set and an object reference is stored in said given object, wherein said table of entries is a data structure distinct from said remembered set.

38. A program storage device readable by a machine, tangibly embodying a program of instructions executable by the machine to perform method steps for managing a generational gargage collection system for a remembered set in a system that stores a plurality of objects that are logically partitioned into at least a first set of objects and a second seet of objects distinct from said first set of objects, said method steps comprising:

setting a barrier bit associated with a given object when said object is promoted to said first set; and storing said given object in a table of entries if said barrrier bit is set and an object reference is stored in said given object, wherein said table of entries is a data structure distinct from said remembered set.

* * * * *